July 8, 1969  R. P. MOORE  3,454,711

NON-COMMUTATED DISPLAY FOR MULTIPLE BEAM SENSORS

Filed April 26, 1966

ROBERT P. MOORE
INVENTOR.

BY
ATTORNEYS

United States Patent Office

3,454,711
Patented July 8, 1969

3,454,711
NON-COMMUTATED DISPLAY FOR MULTIPLE BEAM SENSORS
Robert P. Moore, Riverside, Calif., assignor to the United States of America as represented by the Secretary of the Navy
Filed Apr. 26, 1966, Ser. No. 546,146
Int. Cl. H04n 7/18
U.S. Cl. 178—6                 7 Claims

ABSTRACT OF THE DISCLOSURE

An airborne device for the detailed observation of features on the surface of the earth from a moving aircraft. A multiple beam sensor senses the surface and electrically changes the illumination of a moving belt which can be read by a vidicon tube and displayed on a cathode ray tube.

---

Figure 1:
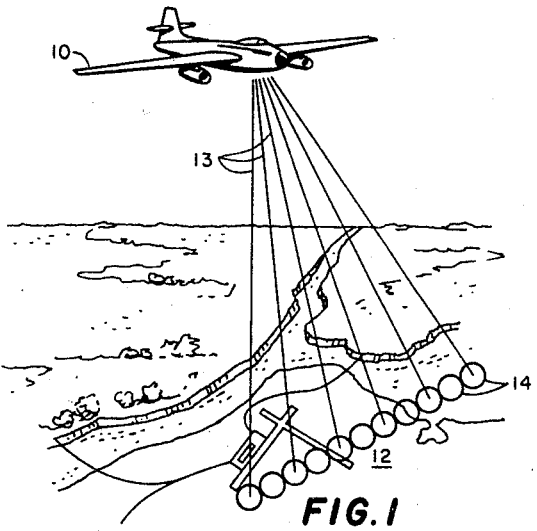

The invention herein described may be maufactured and used by or for the Government of the United States of America for governmental purposes without the payment of any royalties thereon or therefor.

The present invention relates to an airborne device for the detailed observation of features on the surface of the earth from a moving aircraft, and more particularly to an intelligence device utilizing electromagnetic energy detected by means of a multiple beam sensor to scrutinize a strip of terrain over which an airplane or missile is flown.

The device is intended to fill the need for non-commutated displays for multiple beam sensors where the mapping of terrain requires a high resolution.

The sensor output, in commutated display devices, is usually displayed on a cathode ray tube screen for observation or optical processing. The along track dimension of the terrain map is provided by the vehicle motion which is matched by the vertical sweep of the cathode ray tube. The lateral dimension is obtained by commutating between outputs of the channels from each beam. These outputs modulate the cathode ray tube beam as it is swept across the cathode ray tube face in synchronism with the commutation. Commutated display systems require complex bulky synchronization and display sweep drive circuitry. Where a continuous moving scene is desired, it is necessary to use delicate and hard to operate scan converter tubes and their associated circuitry.

The present invention overcomes the disadvantages of the prior art by providing a device which applies the outputs of the various channels in parallel through sliprings and rolling contacts to electroluminescent spots in the form of a modulated alternating current carrier signal. The signal voltage applied to the electroluminescent spots causes the light output of the spots to vary with the sensor output. The electroluminescent spots are suspended in a belt which is positioned so that the illuminated pattern formed by the spots is focused by a lens on the face of a storage vidicon. The image then is a map of the terrain being scanned on the face of the tube which may be read off with a rapid read raster. The new information is read along with enough of the old information to make reasonable size frame for viewing. By using two storage tubes and suitable sweep programs (synchronization between the slow sweep of the tube and the movement of the illuminated spots across the field of view of the tube), a continuous, non-flickering uninterrupted, evenly illuminated display in which the ground appears to move as if viewed through an aperture is obtained.

An object of the present invention is the provision of an airborne detector which overcomes the disadvantages of the above mentioned commutating type devices.

Another object of the invention is the provision of a non-commutating display for multiple beam sensors which eliminate the need for expensive power consuming commutator tubes with their cumbersome circuitry.

Figure 4:
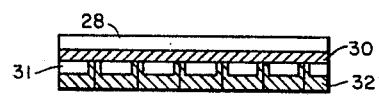
Figure 5:
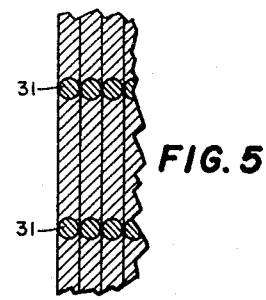
Figure 2:
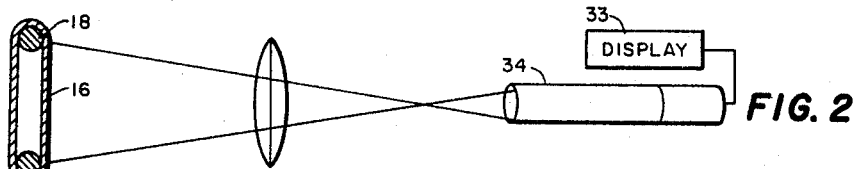
Figure 3:
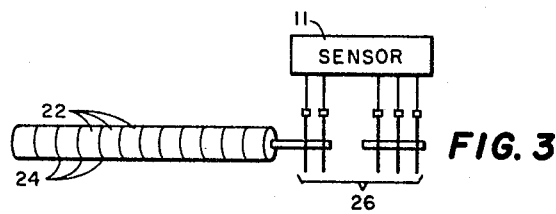
Figure 6:
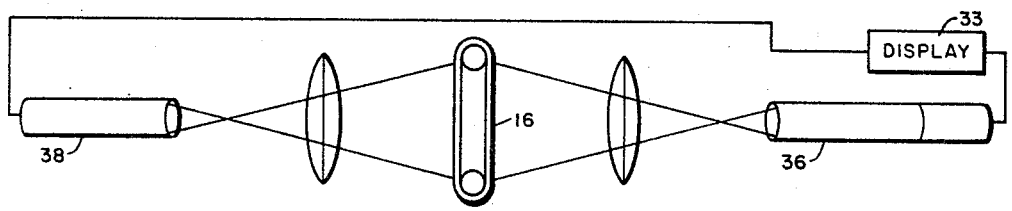
Figure 7:
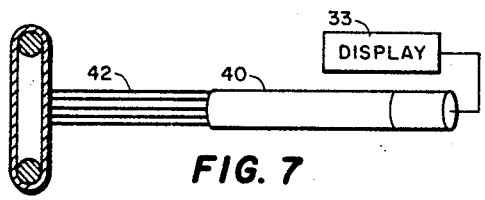

Other objects and many of the attendant advantages of this invention will become readily appreciated as the same becomes better understood by reference to the following detailed description when considered in connection with the accompanying drawings wherein:

FIG. 1 shows an application of the present invention in a terrain mapping exercise.
FIG. 2 is a side elevation of the present invention.
FIG. 3 is a view of the signal roller used in FIG. 2.
FIG. 4 is a cross section of the belt used in FIG. 2.
FIG. 5 is an enlarged section of the belt used in FIG. 2 as viewed through the transparent material.
FIG. 6 is a modification of the embodiment of FIG. 2.
FIG. 7 is a further modification of the embodiment of FIG. 2.

Referring now to the drawings, wherein like reference characters designate like or corresponding parts throughout the several views, there is shown in FIG. 1 an airplane 10 flying over terrain 12 to be mapped. Located in aircraft 10 is a multiple fixed beam sensor 11 (FIG. 3) which generates a plurality of sensing beams 13 for sensing only a small portion of the terrain 12 as indicated by the circles 14. The information sensed by each beam is provided as a separate output and for the example shown in FIG. 1 there would be eleven output channels of information. In FIG. 2 there is shown an electroluminescent belt 16 which turns on roller 18 while being driven by drive roller 20. As shown in FIG. 3, contact roller 18 is provided with a plurality of conducting portions 22 separated by insulating members 24. Each conducting portion 22 of contact roller 18 is respectively connected to one of a plurality of sliprings 26. As shown in FIG. 4, belt 16 consists of a transparent base 28 which may be of any suitable transparent plastic as for example, Mylar, and a transparent conductor 30 which may be for example, tin oxide. Deposited on the transparent conductor 30 are a plurality of spots of electroluminescent material which correspond to the number of conducting portions 22 on contact roller 18. Covering and surrounding spots 31, but touching each other are an equal number of thin strips of opaque conductors as for example aluminum. These thin strips of opaque conductors 32 should be deposited in such a manner as to cover and surround the electroluminescent spot 31, thus preventing display of the spots through the rear of belt 18. Spots 31 may be zinc sulfide. Strips 32 should be spaced such that they are not in contact with each other. Belt 16 is placed on rollers 18 and 20 with transparent conductor 28 positioned on the outside. There should be one conducting portion 22 for each conducting strip 32, which is the number of sliprings 26 and the same number of outputs from the multibeam sensor 11.

Belt 16 is positioned on rollers 18 and 20 such that opaque conducting strips 32 are in contact with corresponding conducting members 22. Since one slipring is connected to one conducting member of roller 18, the output signals from the multibeam sensor will be fed through the sliprings 26 conducting members 22 to the electroluminescent spots 31. All spots 31 on one conducting strip 32 are illuminated the same depending upon the signal votlage applied to the particular conducting strip 32 by way of the conducting member 22 with which it is in contact. The signals fed to sliprings 26 which originate from sensor 11 and may include a plurality of modulators, each being modulated with one of the signals from the beams there being a modulator for each beam. Transparent conductor 28 constitutes a common carrier return for all signals coming from the same generator. The light from each spot 31 will be proportional to the strength of the modulated signal and therefore proportional to the sensor signal which is modulating it.

Illuminated spots 31 are focused onto the face of a permachon tube 34 which may be of the Westinghouse WL7383 type and is an optical-in-electrical-out storage tube, or storage vidicon. As belt 18 moves, it will paint a map on the storage surface of permachon 34, the speed at which belt 16 travels should be correlated with the aircraft speed and altitude. Spots 31 should be placed lengthwise along the belt (FIG. 5) in such a manner that when one set has completed a frame or moves out of the field of view of permachon 34 another set will come into view. The old frame may then be erased and a new one written. The spot size and lateral spacing should be such as to correspond to the antenna beam width and spacing. Magnification and belt speed should be varied with altitude to keep this relationship corrected. An asymmetrical lens system and asymmetrical spots may be used and thereby make lateral spacing independent of one another. The map or image picked up by permachon 34 from belt 16 may be read and displayed on display 33 which may be a conventional cathode ray tube or utilized in a correlator or other data processor at any desired rate since the reading will be independent of the writing. The spot spacing along belt 16 may be made such that one transit of a set of spots will represent several frames of arbitrary lengths.

Referring to FIG. 6, there is shown two pickup tubes 36 and 38. The use of two pickup tubes is to provide continuous reading of information from belt 16. The spacing of the sets of spots 31 should be such that when one set or line of spots moves out of the field of view of tube 36 another set will be coming into the field of view of tube 38. In the reading operation tube 36 would read the information from belt 16 and then be switched off. Tube 38 would then be switched on to read the next frame. The two outputs would be fed to the display apparatus 33.

FIG. 7 shows an alternate method of focusing the information from belt 16 to an imaging tube 40 by means of fiber optics 42. Belt 16 runs in contact with the fiber bundle 42 which will transfer the images to storage tube 40. The fiber optics 42 could be made part of the tube face of storage tube 40 and enclosed in one envelope to make a compact system. The output from tube 40 is then fed to display device 33.

What is claimed is:

1. In a non-commutated display for multiple beam sensors, the combination comprising:
    (a) electromagnetic sensing means for producing a plurality of output signals, each signal varying in proportion to the electromagnetic radiation received by each beam,
    (b) a movable belt having a plurality of electroluminescent spots,
    (c) circuit means connecting the plurality of output signals to said movable belt for causing said spots to be illuminated in proportion to the individual signal strengths,
    (d) conversion circuit means associated with said belt for converting said illuminated spots into a signal representing a map image.

2. The device of claim 1 wherein said movable belt comprises:
    (a) a transparent non-conducting base,
    (b) a transparent conducting material positioned on said transparent base so as to form a thin film on said transparent base,
    (c) a plurality of electroluminescent spots uniformally positioned on the surface of said transparent conducting material,
    (d) opaque conductor means positioned on top of said spots in a manner to cover and surround said spots without being in contact with each other.

3. The device of claim 2 wherein said circuit connecting means includes a cylindrical roller constructed with alternating insulator and conducting portions, a plurality of sliprings mounted on one end of said roller, one of said conducting portions of said roller being connected to one of said sliprings.

4. The device of claim 1 wherein said conversion circuit means comprises a permachon storage tube and an optical focusing means for focusing the illuminated spots of said belt on the face of said permachon storage tube.

5. The device of claim 4 wherein said optical focusing means is a bundle of fiber optics for coupling the light emitted by said illuminated spots onto the face of said permachon storage tube.

6. The device of claim 3 wherein said belt is positioned on said roller so as to engage in electrical contact with the opaque conductor means of said belt with the conducting portions of said roller, there being one opaque conductor for each conducting portion of said belt.

7. The device of claim 1 wherein said conversion means includes a first permachon storage tube for receiving images from said belt, a second permachon storage tube for receiving images from said belt at a point in time later than the image received by said first permachon storage tube, and display means coupled to said first and second permachon storage tubes for providing a continuous display of information received by said first and second permachon storage tubes.

References Cited

UNITED STATES PATENTS

| | | | |
|---|---|---|---|
| 2,909,668 | 10/1959 | Thurlby et al. | 178—6 X |
| 3,198,881 | 8/1965 | Knocklein | 178—6.7 |
| 3,318,996 | 5/1967 | Garfield et al. | 178—6 X |

ROBERT L. GRIFFIN, *Primary Examiner.*

R. H. ECKERT, JR., *Assistant Examiner.*

U.S. Cl. X.R.

178—7.3